United States Patent [19]

Kershaw

[11] Patent Number: 5,705,809

[45] Date of Patent: Jan. 6, 1998

[54] OPTICAL TRANSDUCER FOR MEASURING ACCELERATION OR VIBRATION USING A CURVED LIGHT REFLECTOR

[76] Inventor: Charles H. Kershaw, P.O. Box 87133, Houston, Tex. 77287

[21] Appl. No.: 582,186

[22] Filed: Jan. 2, 1996

[51] Int. Cl.$^6$ .................................................. G01D 5/34
[52] U.S. Cl. ........................... 250/227.14; 250/231.1; 73/514.26
[58] Field of Search ...................... 250/227.14, 231.1, 250/231.11; 73/514.26

[56] References Cited

U.S. PATENT DOCUMENTS

| | | | |
|---|---|---|---|
| 4,185,503 | 1/1980 | Saito | 73/653 |
| 5,063,781 | 11/1991 | Conforti et al. | 73/651 |
| 5,291,014 | 3/1994 | Brede et al. | 250/227.21 |
| 5,359,445 | 10/1994 | Robertson | 359/151 |

*Primary Examiner*—Edward P. Westin
*Assistant Examiner*—Alan L. Giles
*Attorney, Agent, or Firm*—Kenneth A. Roddy

[57] ABSTRACT

An optical transducer, wherein the output end of a light transmitting optical fiber or fiber bundle and the input end of a light receiving optical fiber or fiber bundle are fixed angularly adjacent an effective light receiving area of a movable light reflecting member. The light transmitting optical fiber directs a beam of light from a source onto the light reflecting area at a predetermined angle and the light receiving optical fiber is connected with light detection device for receiving at least a portion of the reflected light and detecting the intensity of the reflected light. Upon acceleration or vibration, the movable light reflecting member moves relative to the output and input ends of the optical fibers such that the movement of its effective light reflecting area varies the intensity of the reflected light and the intensity of the reflected light received by the light receiving optical fiber corresponds approximately logarithmically to the amount of movement of the light reflecting member. In a preferred embodiment the light reflecting member is a convex curved mirror surface at the free end of a resilient spring wherein the incident light beam is directed onto a first arcuate segment of the curved surface and, upon movement, the incident light is directed onto a second arcuate segment of the curved surface of different dimension than the first arcuate segment to vary the intensity of the reflected light.

20 Claims, 4 Drawing Sheets

OPTICAL TRANSDUCER FOR MEASURING ACCELERATION OR VIBRATION USING A CURVED LIGHT REFLECTOR

BACKGROUND OF THE INVENTION

1. Field of the Invention

This invention relates generally to optical transducers and accelerometers, and more particularly to an optical transducer wherein the output end of a light transmitting optical fiber or fiber bundle and the input end of a light receiving optical fiber or fiber bundle are fixed angularly adjacent an effective light receiving area of a movable light reflecting member.

2. Brief Description of the Invention

There are several patents which disclose various optical transducers.

Ruell et al, U.S. Pat. No. 4,356,396 discloses a fiber optical measuring device which contains a fiber optical transmission line into whose input end are directed a first and a second light beam having differing wavelengths. A mirror associated with the output end of the transmission line passes the transmitted second light beam therethrough and reflects the transmitted first light beam back into the transmission line.

Moriyama et al, U.S. Pat. No. 4,739,161 discloses a fine displacement transducer wherein either end of a mutually adjacent first and second optical fiber are aligned with each other opposed to a reflection surface and the illuminating light is made incident from the one end of the first optical fiber and the light irradiated form the other end of the first optical fiber is made to illuminate its reflection surface, while the reflected light therefrom is received by the second optical fiber, so that the displacement of the reflection surface relative to both ends of the second optical fiber can be detected from the variation in intensity of the received light.

Carome, U.S. Pat. No. 5,276,322 discloses a fiber optic accelerometer wherein light from a source is transmitted along an optical fiber through a sensor which includes a cantilevered beam that flexes in response to acceleration causing its free end to move. Light from the optical fiber is transmitted to its terminal end and across a gap. Light transmitted across the gap is returned to the optical fiber by a mirror or received by a free end of a second optical fiber.

Erickson, U.S. Pat. No. 5,339,289 discloses an optical lever acoustic and ultrasound sensor which uses optical amplification to amplify the motion of an acoustic wave and convert it to an electronic signal. In one embodiment, a vibrating mirror is part of a cantilever that increases the angular deflection of an incident light beam. In a second embodiment, a second stationary mirror is positioned approximately parallel to the vibrating mirror surface. The reflected light beam is reflected back onto the vibrating mirror and picks up another increment of the acoustic signal with each reflection. In a third embodiment, the effective moment of the optical lever is increased by the use of two stationary mirrors to increase the path length from the vibrating mirror to the position-sensitive detector.

The present invention is distinguished over the prior art in general, and these patents in particular by an optical transducer wherein the output end of a light transmitting optical fiber or fiber bundle and the input end of a light receiving optical fiber or fiber bundle are fixed angularly adjacent an effective light receiving area of a movable light reflecting member. The light transmitting optical fiber directs a beam of light from a source onto the light reflecting area at a predetermined angle and the light receiving optical fiber is connected with light detection device for receiving at least a portion of the reflected light and detecting the intensity of the reflected light. Upon acceleration or vibration, the movable light reflecting member moves relative to the output and input ends of the optical fibers such that the movement of its effective light reflecting area varies the intensity of the reflected light and the intensity of the reflected light received by the light receiving optical fiber corresponds approximately logarithmically to the amount of movement of the light reflecting member. In a preferred embodiment the light reflecting member is a convex curved mirror surface at the free end of a resilient spring wherein the incident light beam is directed onto a first arcuate segment of the curved surface and, upon movement, the incident light is directed onto a second arcuate segment of the curved surface of different dimension than the first arcuate segment to vary the intensity of the reflected light.

SUMMARY OF THE INVENTION

It is therefore an object of the present invention to provide an optical transducer wherein the output end of a light transmitting optical fiber or fiber bundle and the input end of a light receiving optical fiber or fiber bundle are fixed angularly adjacent an effective light receiving area of a movable light reflecting member.

It is another object of this invention to provide an optical transducer wherein a movable light reflecting member moves relative to the output and input ends of optical fibers such that the movement of its effective light reflecting area varies the intensity of the reflected light and the intensity of the reflected light received by the light receiving optical fiber or fiber bundle corresponds approximately logarithmically to the amount of movement of the light reflecting member.

Another object of this invention is to provide an optical transducer having a movable light reflecting member with a curved mirror surface at the free end of a resilient spring wherein the incident light beam is directed onto a first arcuate segment of the curved surface and, upon movement, the incident light is directed onto a second arcuate segment of the curved surface of different dimension than the first arcuate segment to vary the intensity of the reflected light.

A further object of this invention is to provide an optical transducer which utilizes a movable light reflecting material contained in a transparent tube configured to form an effective light reflecting surface and which material is movable relative to the output end of a light transmitting optical fiber or fiber bundle and the input end of a light receiving optical fiber or fiber bundle such that the movement of the light reflecting material varies the exposed effective light reflecting area and thereby varies the intensity of the reflected light.

A still further object of this invention is to provide an optical transducer which is simple in construction, economical to manufacture, and highly accurate in operation.

Other objects of the invention will become apparent from time to time throughout the specification and claims as hereinafter related.

The above noted objects and other objects of the invention are accomplished by an optical transducer wherein the output end of a light transmitting optical fiber or fiber bundle and the input end of a light receiving optical fiber or fiber bundle are fixed angularly adjacent an effective light receiving area of a movable light reflecting member. The light transmitting optical fiber directs a beam of light from a source onto the light reflecting area at a predetermined angle and the light receiving optical fiber is connected with light detection device for receiving at least a portion of the reflected light and detecting the intensity of the reflected light. Upon acceleration or vibration, the movable light reflecting member moves relative to the output and input ends of the optical fibers such that the movement of its effective light reflecting area varies the intensity of the reflected light and the intensity of the reflected light received by the light receiving optical fiber corresponds approximately logarithmically to the amount of movement of the light reflecting member. In a preferred embodiment the light reflecting member is a convex curved mirror surface at the free end of a resilient spring wherein the incident light beam is directed onto a first arcuate segment of the curved surface and, upon movement, the incident light is directed onto a second arcuate segment of the curved surface of different dimension than the first arcuate segment to vary the intensity of the reflected light.

DESCRIPTION OF THE PREFERRED EMBODIMENT

Referring to the drawings by numerals of reference, there is shown somewhat schematically in FIGS. 1, 2, 3 and 4, a first embodiment of the optical transducer 10 in accordance with the present invention. The optical transducer 10 includes a resilient beam in the form of a flat leaf spring 11 which is fixedly mounted at one end 12 and has a convex curved light reflecting mirror surface 13 at the opposed free end 14. The free end 14 of the flat leaf spring 11 moves due to acceleration or vibrates through a vibration axis 15 as indicated by arrows J and K and displaces the curved light reflecting mirror surface 13 relative to the longitudinal axis of the leaf spring 11. The free end 14 of the leaf spring 11 may be enlarged, narrowed, or weighted with a mass to adjust its sensitivity to acceleration.

Figures 1, 2:
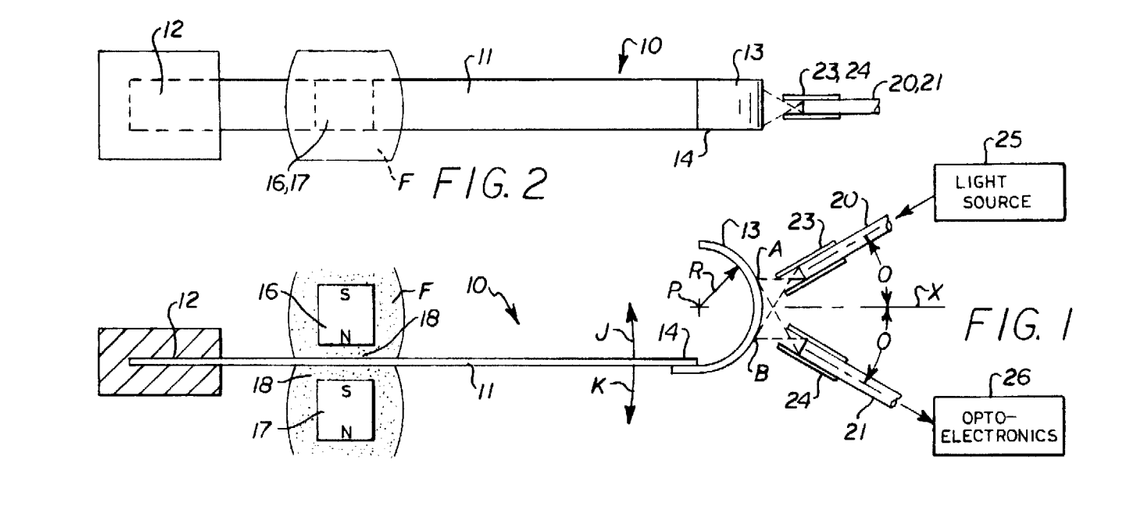
FIG. 1 is a side elevation of an optical transducer in accordance with the present invention utilizing a convex curved light reflecting mirror.
FIG. 2 is a top plan view of the optical transducer of FIG. 1.

The reflective mirror surface 13 may be integral with the spring 11. For example, the leaf spring may have a curved surface at its outer end with a highly polished surface finish to form the light reflective surface.

It should be understood that the resilient beam may be of other configurations which could support a reflective surface and allow the reflective surface to vibrate, for example, the supporting resilient member may be a helical spring or a multiple leaf spring.

A means of damping the vibration or response rate of the spring may also be provided. For example, in FIGS. 1 and 2, the vibration of the leaf spring 11 is dampened by a pair of opposed permanent magnets 15 and 16, one disposed above the flat surface of the spring and the other below the flat surface of the spring with their opposed poles facing. The faces of the magnets 15 and 16 are spaced a distance from the flat surfaces of the spring to define a gap 18 therebetween. A ferro-magnetic fluid F may also be used which fills the magnetic gap and surrounds a portion of the spring 11 and magnets 15 and 16. Optionally, the entire spring 11 may be encased in a viscous fluid to dampen the vibration or response rate.

As shown in FIGS. 1 and 2, the curved light reflecting mirror surface 13 is a segment of a circle having a radius of curvature R and an effective light reflecting region extending from point A to point B on its curved surface.

In the following discussion, the light transmitting means and light receiving means are described as an optical "fiber", however it should be understood that an optical "fiber bundle" may be used in place of the "fiber".

One end of a first optical fiber or fiber bundle 20 and one end of a second optical fiber or fiber bundle 21 are positioned a distance outward from the light reflecting region A-B of the mirror surface 13 and their axes are positioned at opposed angles relative to one another. The axis of each optical fiber or fiber bundle 20 and 21 is disposed at an angle "O" relative to a plane X normal to the curved effective light reflecting region A-B on the curved mirror surface 13.

The ends of the optical fibers 20 and 21 are each surrounded by a tubular member 23 and 24, respectively, which are painted black or are otherwise rendered non-reflective. The outer ends of the tubular members 23 and 24 are spaced relative to the ends of the optical fibers 20 and 21, respectively, to confine light rays transmitted or received to the acceptance angle of the respective optical fiber or fiber bundle. The space between the light reflective mirror surface 13 and the optical fibers 20 and 21 may be filled by vacuum, gas or liquid.

The tubular members 23 and 24 also prevent direct transmission of light between the transmitting and receiving fibers 20 and 21. It should be understood that means may be used to prevent direct transmission. For example, an opaque sheet may be placed between the fibers 20 and 21 to prevent direct light transmission such that the light transmitted in only from the mirror surface.

The first optical fiber or fiber bundle 20 transmits a light beam from a light source 25 onto the light reflecting mirror surface 13 in the region A-B where it is reflected, and the reflected light beam is received by the second optical fiber or fiber bundle 21 and passes to an opto-electrical sensor 26 which senses changes in the intensity of the received light.

The angle O, the distance apart of tubular members 23 and 24, the distance from the mirror surface 13, and the radius of curvature R of the light reflecting region A-B all are correlated to allow the maximum light reflection at one extreme of the vibration cycle or the center. In the latter case, there will be two sets of transmitting and receiving fibers, each seeing alternate half cycles. The length of the spring 11 and the displacement of the curved effective light reflecting region A-B through the vibration axis 15 in both directions J-K normal to the longitudinal axis of the spring determine the total dynamic response range and the linearity of this response in a semi-logarithmic plot. For example, the use of a flat spring as shown in FIGS. 1 and 2 allows a discrimination of at least 50 dB against response to movement or acceleration in any axis normal to the vibration axis JK.

Figure 3:
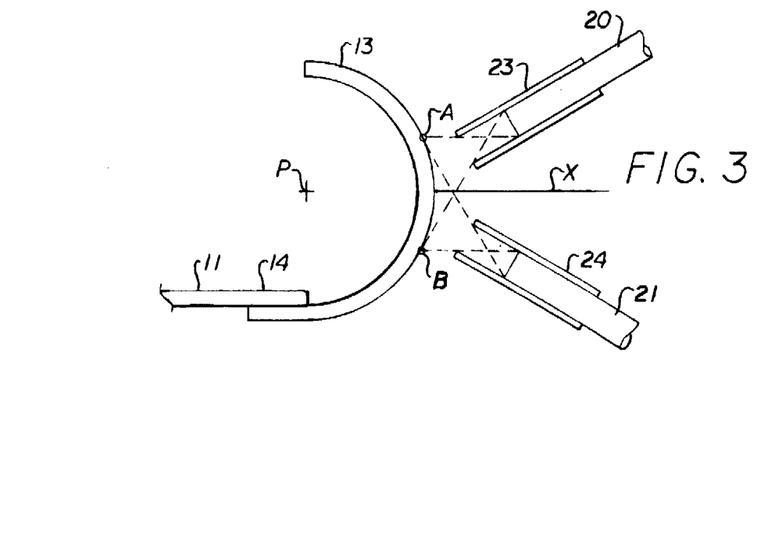
FIG. 3 is an enlarged side elevation of the convex curved light reflecting mirror.
Figure 4:
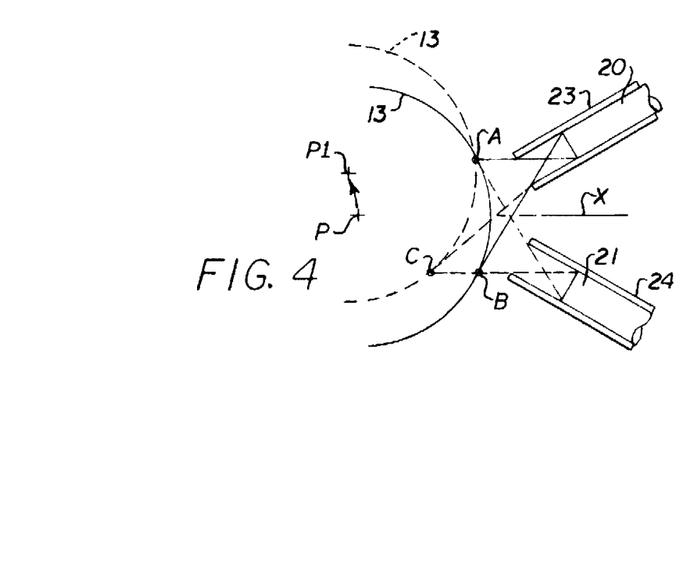
FIG. 4 is an enlarged side elevation showing schematically the movement of the curved light reflecting mirror surface showing the change in the angular deflection of the incident light beam as upon movement of the light reflecting mirror surface.

Referring now to FIGS. 3 and 4, the movement of the curved light reflecting mirror surface 13 having an effective light reflecting region A-B on its curved surface is shown schematically in larger scale. In FIG. 4, the curved light reflecting mirror surface 13 is shown in solid line in the lower light flux position, and is shown in dashed line in the maximum light flux position. The letter P represents the center of curvature of the curved surface in the lower light flux position and P1 represents the center of curvature of the curved surface in the maximum light flux position.

As the spring 11 and reflective surface 13 vibrate along the vibration axis 15 in one direction (J) normal to its longitudinal axis, the center of curvature moves from point P to point P1 and the curved reflective surface moves relative to the fixed optical fibers 20 and 21.

In the lower light flux position, point P, the optical fiber or fiber bundle 20 transmits a beam of light onto the first arcuate region A-B on the curved surface and the reflected light is received by the optical fiber or fiber bundle 21. As the curved surface 13 moves to the maximum light flux position, point P1, the incident beam is reflected by a second region A-C on the curved surface which is greater than A-B, and thus changes the intensity of the reflected light received by optical fiber or fiber bundle 21.

The total light flux reflected is primarily a function of:
1. the angle between the beams transmitted by and received by the optical fibers 20 and 21;
2. the displacement of the reflecting surface from point P to point P1;
3. the smoothness of the reflective mirror surface 13; and
4. the radius of curvature R of the reflective mirror surface.

For a suitable combination of these four parameters, the total light flux through-put is approximately logarithmic with regard to the lineal displacement of the mirror from point P to P1. Thus, by taking the antilog of the total light flux, there is a lineal relationship between the total light flux and the mirror displacement P-P1 over a very large dynamic range; for example, 120 dB or more.

The term "approximately logarithmic" as used herein means that the light transduction is as close to logarithmic as the design constants and actualization allow.

Figure 5:
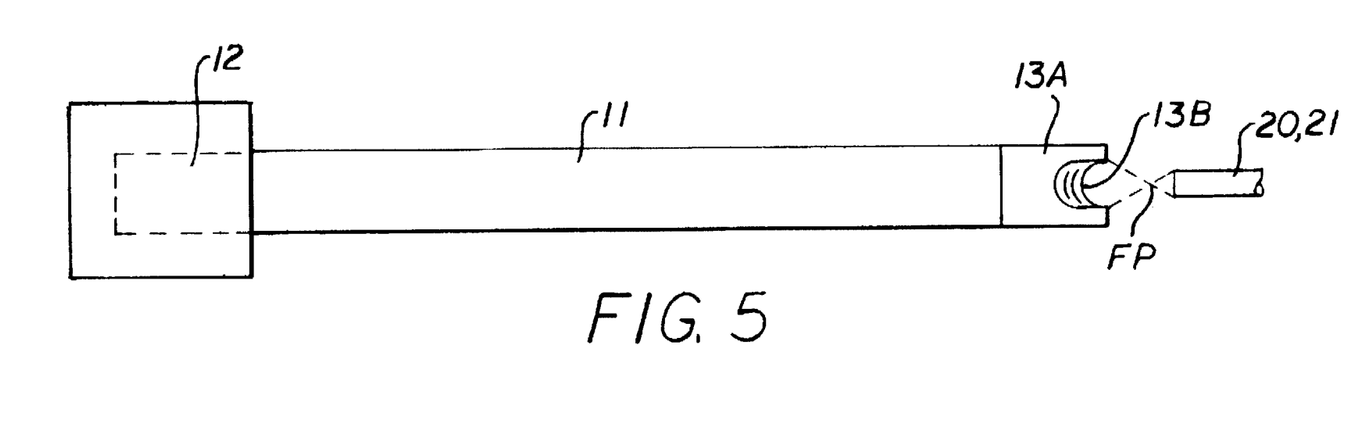
FIG. 5 is a top plan view of an optical transducer in accordance with the present invention utilizing a concave curved light reflecting mirror surface.

FIG. 5 is a top plan view of a modification of the optical transducer wherein the curved reflecting member 13A has a concave curved light reflecting mirror surface 13B which receives the transmitted light beam and its radius of concave curvature concentrates the reflected light beam by focusing the reflected light in a focal plain FP. The concave surface 13B may be formed along a portion of the curved surface, or may extend along the entire length of the curved surface.

Figure 6:
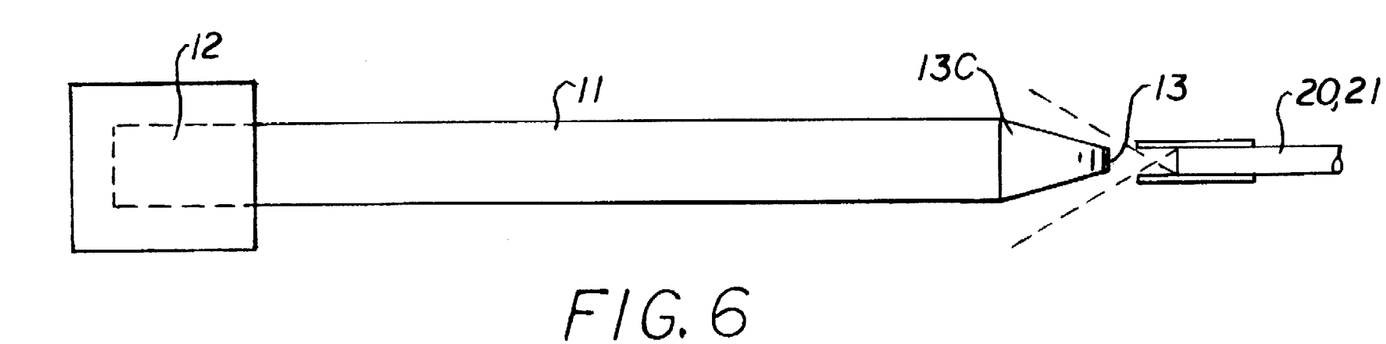
FIG. 6 is a top plan view of an optical transducer in accordance with the present invention utilizing a tapered light reflecting surface.

FIG. 6 is a top plan view of another modification of the optical transducer wherein the width of the curved reflecting surface 13C is narrowed adjacent the optical fibers 20 and 21 to limit the width of the incident light beam and the reflected light beam.

It should be understood that the mirror surface configurations may be modified from the circular or curved configuration or may have a combination reflection/refraction surface to produce a desired logarithmic response. The mirror 13 may also be replaced by an optically equivalent holographic optical element.

Figure 7:
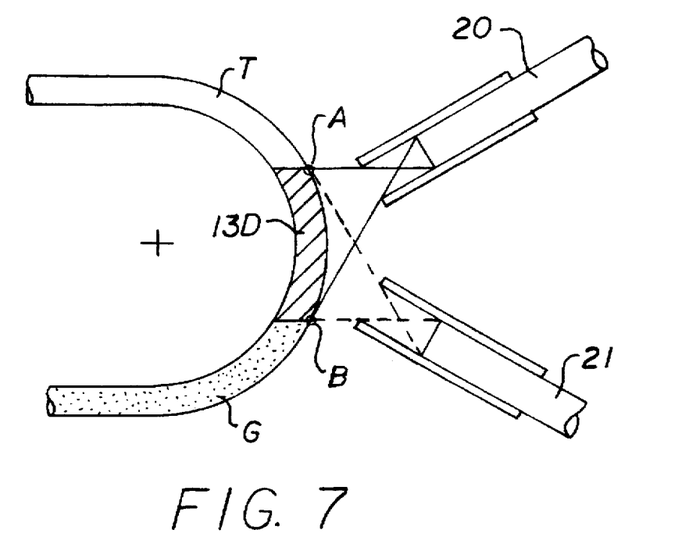
FIGS. 7 and 8 are side elevations of an optical transducer in accordance with the present invention utilizing a light reflecting medium supported on a fluid spring.
Figure 8:
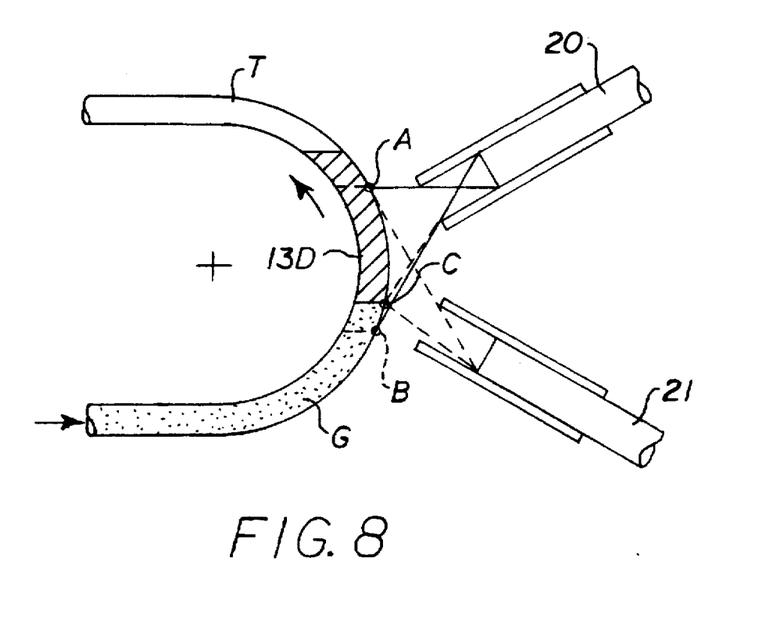

FIGS. 7 and 8 illustrate schematically another embodiment of the optical transducer wherein the light reflecting element 13D is in form of a liquid or a gel, such as a column of mercury, inside a curved tube T and is supported on a sealed column of gas G constituting the spring element. In FIG. 8, the light reflecting medium 13D is shown in an at-rest position which provides an effective light reflecting region from point A to point B on the curved surface of the tube T. FIG. 8 shows the light reflecting medium moved in an upward direction due to a pressure change in the supporting gas spring G, however, it should be understood, that the light reflecting medium may move in both upward and downward directions due to pressure changes in the supporting gas spring. As the light reflective medium 13D moves due to a change in pressure of the supporting gas spring G, the effective light reflecting region moves relative to the fixed optical fibers 20 and 21. As shown in FIG. 8, when the light reflective medium passes above (or below) the fixed effective light reflecting area A-B on the tube T, the amount of light reflected decreases because the reflecting surface area is shortened from A-B to A-C, thus the amount or intensity of the reflected light changes.

Figure 9:
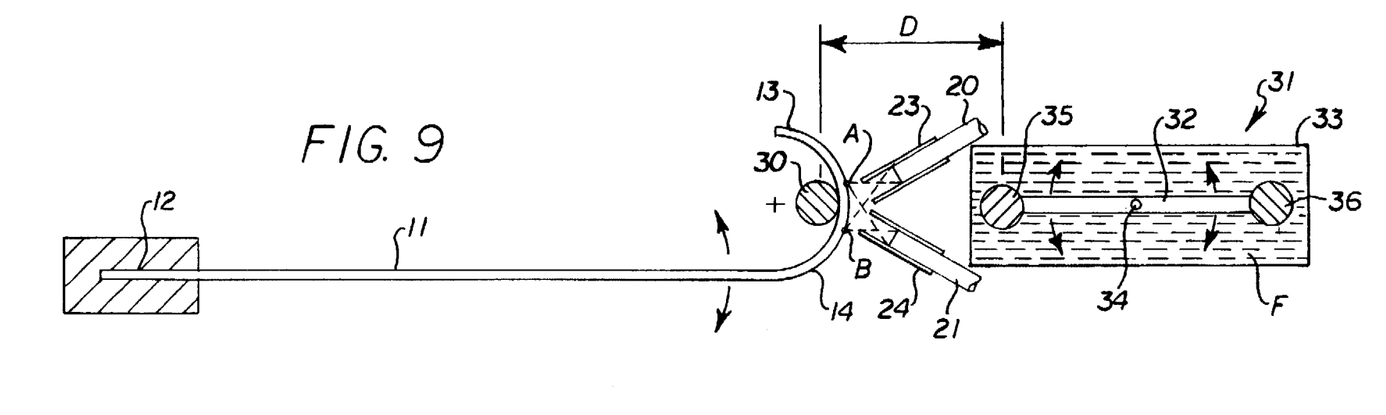
FIGS. 9 and 10 are side elevations of an optical transducer in accordance with the present invention utilizing a magnetic motion detection system in combination with the light reflecting mirror surface.
Figure 10:
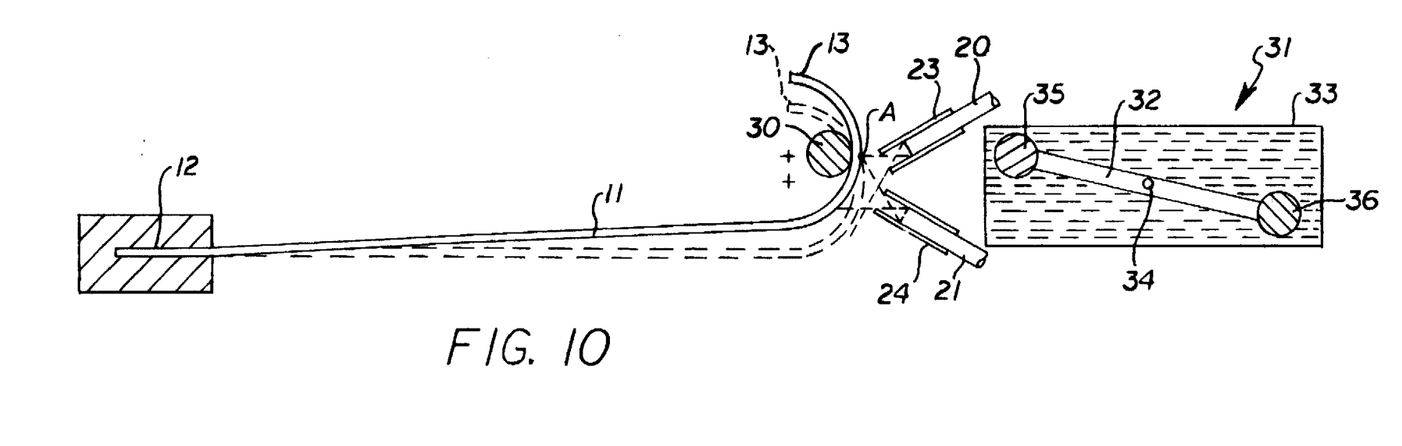

Referring now to FIGS. 9 and 10, the optical transducer as previously described may be provided with additional motion transmitters and sensors to detect and relay information relative to its movement. For example, FIG. 9 shows an embodiment similar to that described with reference to FIGS. 1-4, having a resilient flat leaf spring 11 fixedly mounted at one end 12 and a convex curved light reflecting mirror surface 13 at the opposed free end 14 which has an effective light reflecting region A-B on its curved surface. A magnet 30 is mounted at the free end 14 of the spring 11 adjacent to the light reflecting mirror surface 13 to move therewith. The magnet 13 may also serve as a weight mass.

As previously described, one end of a first optical fiber or fiber bundle 20 and one end of a second optical fiber or fiber bundle 21 are positioned a distance outward from the light reflecting region A-B of the mirror surface 13 and their axes are positioned at opposed angles relative to one another. The ends of the optical fibers 20 and 21 may be surrounded by a tubular member 23 and 24, respectively, to confine light rays transmitted or received to the acceptance angle of the respective optical fiber or fiber bundle. The first optical fiber or fiber bundle 20 transmits a light beam from a light source onto the light reflecting mirror surface 13 in the region A-B where it is reflected and the reflected light beam is received by the second optical fiber or fiber bundle 21 and passes to an opto-electrical sensor which senses changes in the intensity of the received light.

A sensor device 31 is positioned a distance from the light reflecting mirror surface 13. The sensor device 31 has a beam 32 pivotally mounted in a non-magnetic housing 33 by a pivot pin 34. A magnetic member 35 is mounted at one end of the beam 32 adjacent the magnet 30 and a counterweight 36 is mounted on the opposite end of the beam. The magnet 30 and the magnetic member 35 are spaced apart a distance D such that the magnetic member 35 is attracted to the magnet 30. The housing 33 may be filled with a viscous fluid F to dampen the pivotal movement of the response rate of the beam 32.

The transmitted light from optical fiber or fiber bundle 20 is received on the light reflecting mirror surface 13 in the region A-B where it is reflected, and the reflected light beam is received by the second optical fiber or fiber bundle 21 and passes to an opto-electrical sensor (not shown) which senses changes in the intensity of the received light, as previously described.

As shown in FIG. 10, as the spring 11, and the reflective mirror surface 13 and magnet 30 at its free end move or vibrate relative to the fixed optical fibers 20 and 21, the magnetic member 35 moves with it due to the magnetic attraction and the sensor beam 32 pivots about the pivot pin 34.

The damping or sensitivity of the sensor device may also be adjusted by altering distance D, the location of the pivot pin 34, or by substitution of magnetic members 35 of different materials to alter the magnetic attraction.

Although the light beams have been shown in the illustrated embodiments as being transmitted and received through optical fibers having ends surrounded by a tubular member which would provide a conical beam, it should be understood that the light beams may be any shape and may be formed by light conduits, optical fibers, geometrical optics, or directly by the beam properties of semiconductor devices, such as lasers or photo diodes. It should also be understood that there may be multiple sets of beams fixed with respect to multiple reflective mirror surfaces, and that combinations of light beams may have polarized light, different wavelengths, or may be pulsed at different rates, so as to differentiate various perturbations on the basic displacement of the reflecting surface or to act as nulling devices.

Although the reflective mirror surface has been described as being fixed to the free end of a cantilevered vibrating or oscillating spring with displacement in a short arc, it should be understood that the displacement may be a segment of a complete circular path in the form of a rotary motion transducer.

The present optical transducer may be an integral component of a closed servo loop wherein a small displacement of the spring or cantilever is nulled out by an increasing or decreasing magnetic or electrostatic force, which force may incorporate electronic means to dampen vibratory motion. Thus, this force may become an analogue of the acceleration force upon the spring and mass. In such a case, only a small portion of the transducer range would be utilized.

While this invention has been described fully and completely with special emphasis upon several preferred embodiments, it should be understood that within the scope of the appended claims the invention may be practiced otherwise than as specifically described herein.

I claim:

1. An optical transducer comprising:
   a movable light reflecting member having an effective light reflecting area on its surface configured to receive a beam of light and form a reflected light;
   light transmitting means connected with a light source and having an output end fixed angularly adjacent said effective light reflecting area for directing a beam of light onto said light reflecting area at a predetermined angle;
   light receiving means connected with light detection means and having an input end fixed angularly adjacent said effective light reflecting area at a predetermined angle for receiving at least a portion of said reflected light and detecting the intensity of the reflected light;
   said light reflecting member being movable relative to said output end of said light transmitting means and said input end of said light receiving means such that the movement of said effective light reflecting area varies the intensity of said reflected light; and
   the intensity of the reflected light received by said light receiving means corresponds approximately logarithmically to the amount of movement of said light reflecting member.

2. An optical transducer according to claim 1 further comprising:
   resilient means connected with said movable light reflecting member for moving said light reflecting member in a reciprocating path relative to said output end of said light transmitting means and said input end of said light receiving means such that the total intensity of the reflected light received by said second light guide means corresponds approximately logarithmically to the amount of reciprocal movement of said light reflecting member.

3. An optical transducer according to claim 2 further comprising:
   said resilient means comprises a spring connected with said movable light reflecting member for moving said light reflecting member along said reciprocating path.

4. An optical transducer according to claim 3 wherein
   said spring comprises a leaf spring fixed at one end and having a free end connected with said movable light reflecting member for moving said light reflecting member in an arcuate path relative to said output end of said light transmitting means and said input end of said light receiving means such that the total intensity of the reflected light received by said light receiving means corresponds approximately logarithmically to the amount of movement of said light reflecting member.

5. An optical transducer according to claim 4 further comprising:
   damping means connected with said leaf spring to dampen the response rate of said leaf spring.

6. An optical transducer according to claim 5 wherein
   said damping means comprises at least one magnet positioned adjacent said leaf spring to dampen the response rate of said leaf spring.

7. An optical transducer according to claim 5 wherein
   said damping means comprises a viscous fluid surrounding at least a portion of said leaf spring to dampen the response rate of said leaf spring.

8. An optical transducer according to claim 1 wherein
   said movable light reflecting member has a curved light reflecting area on its surface configured to receive a beam of light and form a reflected light;
   said light transmitting means output end is fixed angularly adjacent said curved light reflecting area for directing a beam of light onto a first arcuate segment of said curved light reflecting area at a predetermined angle;
   said light receiving means input end is fixed angularly adjacent said curved light reflecting area at a predetermined angle for receiving at least a portion of said reflected light;
   said curved light reflecting area is movable relative to said output end of said light transmitting means and said input end of said light receiving means such that upon movement of said light reflecting member, said transmitted beam of light is directed onto a second arcuate segment of said curved light reflecting area of different dimension than said first arcuate segment to vary the intensity of said reflected light; and
   the intensity of the reflected light received by said light receiving means corresponds approximately logarithmically to the amount of movement of said light reflecting member.

9. An optical transducer according to claim 8 wherein said curved light reflecting area is a convex curved area.

10. An optical transducer according to claim 8 wherein said curved light reflecting area is a concave curved area.

11. An optical transducer according to claim 1 wherein said movable light reflecting member has adjacent straight and curved light reflecting areas on its surface configured to receive a beam of light and form a reflected light;

said light transmitting means output end is fixed angularly adjacent said straight and curved light reflecting areas for directing a beam of light onto a first one of said light reflecting areas at a predetermined angle;

said light receiving means input end is fixed angularly adjacent said first one of said light reflecting areas at a predetermined angle for receiving at least a portion of said reflected light;

said light reflecting member is movable relative to said output end of said light transmitting means and said input end of said light receiving means such that upon movement of said light reflecting member, said transmitted beam of light is directed onto a second one of said light reflecting areas to vary the intensity of said reflected light; and the intensity of the reflected light received by said light receiving means corresponds approximately logarithmically to the amount of movement of said light reflecting member.

12. An optical transducer according to claim 1 wherein said movable light reflecting member is a light reflecting material contained in a transparent tube configured to expose an effective light reflecting area of said material to receive a beam of light and form a reflected light;

said light transmitting means output end is fixed angularly adjacent said tube material for directing a beam of light onto said light reflecting area of said material at a predetermined angle;

said light receiving means input end is fixed angularly adjacent said tube at a predetermined angle for receiving at least a portion of said reflected light;

said light reflecting material is movable relative to said output end of said light transmitting means and said input end of said light receiving means such that the movement of said light reflecting material varies the exposed effective light reflecting area and thereby varies the intensity of said reflected light; and the intensity of the reflected light received by said light receiving means corresponds approximately logarithmically to the amount of movement of said light reflecting material.

13. An optical transducer according to claim 12 further comprising:

spring means supporting said movable light reflecting material and moving said light reflecting material relative to said output end of said light transmitting means and said input end of said light receiving means.

14. An optical transducer according to claim 13 wherein said spring means comprises a column of fluid supporting said light reflecting material in said tube and moving said light reflecting material relative to said output end of said light transmitting means and said input end of said light receiving means in response to fluid pressure.

15. An optical transducer according to claim 12 wherein said tube has a curved portion and said movable light reflecting material is contained in an arcuate segment of said tube curved portion to expose a curved effective light reflecting area of said material to receive a beam of light and form a reflected light;

said light transmitting means output end is fixed angularly adjacent said tube curved portion for directing a beam of light onto a first arcuate segment of said curved light reflecting area of said material at a predetermined angle;

said light receiving means input end is fixed angularly adjacent said tube curved portion at a predetermined angle for receiving at least a portion of said reflected light;

said light reflecting material is movable relative to said output end of said light transmitting means and said input end of said light receiving means such that upon movement of said light reflecting material, said transmitted beam of light is directed onto a second arcuate segment of said curved light reflecting area of different dimension than said first arcuate segment to vary the intensity of said reflected light; and the intensity of the reflected light received by said light receiving means corresponds approximately logarithmically to the amount of movement of said light reflecting material.

16. An optical transducer according to claim 1 wherein said light transmitting means comprises an optical fiber having an output end, and said light receiving means comprises an optical fiber having an input end.

17. An optical transducer according to claim 16 wherein said input and output ends of said are each surrounded by a non-reflective tubular member, and the outer ends of each said tubular member is spaced relative to the respective said output and input ends of said optical fibers to confine light rays transmitted or received to the acceptance angle of the respective optical fiber.

18. A method of using an optical transducer to determine a sensed condition comprising the steps of:

connecting a movable light reflecting member to move in response to a condition to be sensed, said light reflecting member having an effective light reflecting area on its surface configured to receive a beam of light and form a reflected light;

transmitting a beam of light through an output end of a light transmitting means angularly onto said effective light reflecting area to form a reflected light;

receiving at least a portion of the reflected light through an input end of a light receiving means connected at another end with light detection means for detecting the intensity of the received reflected light; and allowing said reflecting member to move relative to said output end of said light transmitting means and said input end of said light receiving means responsive to the condition being sensed such that the movement of said effective light reflecting area varies the intensity of said reflected light; whereby the detected intensity of the reflected light received by said light receiving means corresponds approximately logarithmically to the amount of movement of said light reflecting member.

19. The method according to claim 18 wherein said movable light reflecting member has a surface shaped to provide a first and a second light reflecting area upon movement thereof;

said light transmitting means output end is fixed angularly adjacent a first one of said light reflecting areas for directing a beam of light onto a first one of said light reflecting areas at a predetermined angle;

said light receiving means input end is fixed angularly adjacent said first one of said light reflecting areas at a predetermined angle for receiving at least a portion of said reflected light;

said light reflecting member is moved relative to said output end of said light transmitting means and said input end of said light receiving means such that upon movement of said light reflecting member, said transmitted beam of light is directed onto a second one of said light reflecting areas to vary the intensity of said reflected light; and the intensity of the reflected light received by said light receiving means corresponds approximately logarithmically to the amount of movement of said light reflecting member.

20. The method according to claim 18 wherein said movable light reflecting member is a light reflecting material contained in a transparent tube configured to expose an effective light reflecting area of said material to receive a beam of light and form a reflected light;

said light transmitting means output end is fixed angularly adjacent said tube material for directing a beam of light onto said light reflecting area of said material at a predetermined angle;

said light receiving means input end is fixed angularly adjacent said tube at a predetermined angle for receiving at least a portion of said reflected light; and said light reflecting material is moved relative to said output end of said light transmitting means and said input end of said light receiving means such that the movement of said light reflecting material varies the exposed effective light reflecting area and thereby varies the intensity of said reflected light; and the intensity of the reflected light received by said light receiving means corresponds approximately logarithmically to the amount of movement of said light reflecting material.

\* \* \* \* \*